Patented Oct. 12, 1943

2,331,744

UNITED STATES PATENT OFFICE 2,331,744

METHOD OF PREPARING PHENOL-FORMALDEHYDE CONDENSATION PRODUCTS

Robert C. Swain, Riverside, and Pierrepont Adams, Stamford, Conn., assignors to American Cyanamid Company, New York, N. Y., a corporation of Maine No Drawing. Application November 8, 1940, Serial No. 364,848

2 Claims. (Cl. 260—19)

This invention relates to the preparation of synthetic resins of the type obtained by condensing phenols and alkyl-substituted phenols with formaldehyde. A principal object of the invention is the preparation of phenolic condensation products having better light-stability, color, hardness and arc resistance, in a more expeditious and economical manner.

Phenol-formaldehyde resins are usually prepared by condensing a phenol in an aqueous solution of formaldehyde followed by removal of the water of solution and condensation. When preparing many types of phenol-formaldehyde condensation products the resin must be dehydrated when the desired stage of condensation has been reached. This dehydration step represents a considerable part of the production costs. Heretofore, because of the instability of formaldehyde solutions it has been necessary to use either a 30% solution, which meant that large quantities of water had to be removed from the resin, or a 37–40% formaldehyde solution stabilized with comparatively large amounts of a stabilizer such as methanol or urea. The presence of these stabilizers is objectionable, for methanol creates a definite fire hazard, may interfere with the phenol-formaldehyde condensation, and is difficult to recover from the distillate obtained in the dehydration. Urea remains in the resin and lends properties to it which are sometimes undesirable. Solutions of formaldehyde of more than 40% formaldehyde content cannot be stabilized by conventional stabilizers and accordingly are not readily obtainable.

In our copending application Serial No. 306,516, filed November 28, 1939, now Patent No. 2,237,092, April 1, 1941, we described a method of stabilizing formaldehyde by the addition thereto of melamine or methylol melamines in amounts of about 1–10%. We have now discovered that a number of unexpected and surprising advantages are obtained by using formaldehyde stabilized with these amounts of melamine in the preparation of phenol-formaldehyde condensation products.

One of the most surprising discoveries made in connection with our use of melamine-stabilized formaldehyde in the preparation of phenol-formaldehyde resins is that the resin so produced has a marked improvement in its color stability when exposed to light. Since phenol-formaldehyde resins are notoriously poor in this respect an improvement in their light stability is of great importance. Resins and varnishes prepared according to our invention are also found to have improved electrical properties, especially arc resistance, which broadens the field of utility of this class of resins in the field of insulators and insulating varnishes. We have also found that phenol-formaldehyde varnishes produced according to methods employing our melamine-stabilized formaldehyde give films having considerably better hardness and chemical resistance.

In the preparation of phenol-formaldehyde condensation products in which concentrated solutions of melamine-stabilized formaldehyde, for example 40–50%, are used, the condensation reaction proceeds much more rapidly and a considerable saving in time is effected. Also, since the solution is more concentrated the capacity of the reaction vessel is accordingly increased. More important, in the dehydration step which follows less water need be removed from the resin, which enables us to complete the dehydration in a shorter period of time with a minimum amount of polymerization. A much thinner resin is thus obtainable.

The melamine-stabilized formaldehyde which we employ in practicing our invention is prepared simply by dissolving 1–10% of melamine or methylol melamines in an aqueous formaldehyde solution preferably by adding the melamine and heating to 60–80° C. for a short time. As is well-known aqueous formaldehyde solutions of greater than 30% containing no stabilizer will precipitate paraformaldehyde on storage at low temperatures. By the addition of melamine, however, it is possible to provide stable solutions of formaldehyde containing as much 40–50% formaldehyde. 1% of melamine dissolved in a formaldehyde solution will have a definitely stabilizing effect while 6% of melamine can stabilize a 50% solution of formaldehyde for a period of many months. Although it is possible to dissolve more than 10% melamine in aqueous formaldehyde it is in general not desirable to do so because of the possible formation of a gel as described in our copending application referred to above.

The phenol-formaldehyde condensation is carried out in much the same manner as when using ordinary formaldehyde, due regard being given however to the concentration of the formaldehyde solution employed. When using melamine-stabilized formaldehyde of 40–50% strength it will be found that the reaction proceeds much more rapidly and care must be taken that condensation does not proceed beyond the desired stage. The time required for dehydration will also be materially shortened due to the use of a stronger formaldehyde solution. Formaldehyde of 30-40% strength, stabilized with melamine may be employed when the principal object is to provide a resin of greater light stability, hardness and arc resistance rather than with speed and economy of reaction.

Any of the common phenols or alkyl substituted phenols such as phenol itself, cresol, commercial cresylic acids, xylenols and the like may be used. When preparing an oil-soluble condensation product for use in varnishes, etc. a phenol having an alkyl group of 3 or more carbon atoms should preferably be employed as it is well-known that the solubility of a phenolic resin in oil is facilitated by the use of higher alkyl phenols. Typical alkyl phenols which may be used are n-butyl phenol, p-tertiary butyl phenol, p-tertiary amyl phenol, etc. Other substituted phenols which are known to produce oil-soluble condensation products with formaldehyde, and which may be used in practicing the present invention, are p-phenyl phenol, p-dihydroxy diphenyl, cyclohexyl phenol and the like.

Any of the common acid or alkaline catalysts employed in the phenol-formaldehyde condensation reaction may be used or if desired none at all. Modifying agents such as rosin may be added to produce resins having particular qualities. The resins produced according to our invention may be cast or made into molding compositions or varnishes according to procedures well understood in the art.

The following specific examples are given to illustrate a few of the possible variations permissible in the preparation of improved phenolic condensation products employing melamine-stabilized formaldehyde in accordance with our invention.

*Example 1*

82 parts of p-tertiary amyl phenol and 52 parts of a 50% solution of formaldehyde stabilized with 7% of melamine were mixed in a suitable vessel provided with a reflux condenser and heated with refluxing for 2 hours. The vessel was then provided with distillation means and the resin was dehydrated by heating to 155° C. and thereupon a vacuum of about 13 inches was applied to assist in the removal of the water. After 28 minutes and at a temperature of 180° C. the dehydration was completed. Upon cooling a yield of 88.5 parts of a clear, hard and brittle, oil-soluble resin was obtained.

*Example 2*

A varnish was prepared by heating 20 parts of the resin prepared from melamine-stabilized formaldehyde as described in Example 1 with 40 parts of tung oil at 230-240° C. for 25 minutes. 20 parts of bodied linseed oil were then added. The surprisingly good yield of 79.5 parts was obtained. 79.5 parts of xylene as solvent and 0.024 parts of cobalt metal as drier in the form of cobalt linoleate were added to form a varnish.

*Example 3*

200 parts of phenol, 239 parts of a 50% solution of formaldehyde containing 7% melamine as stabilizer and 5 parts of a 25% solution of NaOH were heated at 100° C. for 14 minutes. Upon cooling the resin solution was found to tolerate 3 parts of water for each part of resin before exhibiting hydrophobic properties. 860 parts of G gum rosin and 300 parts of W W wood rosin were heated to 130° C. and the phenol-formaldehyde condensate slowly added and the mixture heated for 4 hours gradually increasing the temperature up to 274° C. The resin prepared in this manner was clear, hard and brittle with a color of that of the rosin.

An excellent varnish of improved hardness and chemical resistance may be prepared from this resin by the addition of tung oil and heating followed by the addition of linseed oil, solvent, and drier as described in Example 2.

*Example 4*

108 parts of a cresol mixture composed of approximately 60% metacresol and 40% para-cresol were mixed with 0.6 parts of sulfuric acid, diluted with a small amount of water, and 103 parts of a 50% solution of formaldehyde stabilized with 6½% melamine. This solution was then heated to reflux in about 15 minutes. At this point the solution had separated into a resinous and an aqueous layer, and after a short period of further refluxing the solution was dehydrated by vacuum distillation. A clear, hard and brittle resin was obtained on cooling.

The resin formed in this example may be melted and cast, or ground and compounded on mixing rolls with appropriate pigments, fillers, plasticizers, mold lubricants, catalysts, etc., and worked into useful objects in accordance with methods conventionally employed in ordinary phenol-formaldehyde resin manufacture.

What we claim is:

1. A method of preparing oil-soluble phenolic condensation products which comprises heating an alkyl phenol having an alkyl group of at least 3 carbon atoms with a methanol-free aqueous solution containing dissolved therein 40 to 50% by weight of formaldehyde and 1 to 10% by weight of melamine at refluxing temperatures until the said materials have at least partially reacted and thereafter removing the water in the reaction mixture by distillation.

2. A method of preparing a phenol-formaldehyde varnish yielding films of good hardness, chemical resistance and improved electrical properties, which comprises heating an alkyl phenol having alkyl groups of at least 3 carbon atoms with a methanol-free aqueous solution containing dissolved therein 40 to 50% by weight of formaldehyde and 1 to 10% by weight of melamine at refluxing temperatures until the said materials have at least partially reacted, removing the water in the reaction mixture by distillation under reduced pressure, adding a drying oil and continuing the heating until the drying oil is thoroughly incorporated therewith.

ROBERT C. SWAIN.
PIERREPONT ADAMS.